United States Patent
Kuboyama

Patent Number: 5,996,247
Date of Patent: Dec. 7, 1999

[54] EXTRACTION AND DRYING METHOD

[75] Inventor: Nobuyoshi Kuboyama, Carlisle, Mass.

[73] Assignee: Big Beans Holding Ltd., Carlisle, Mass.

[21] Appl. No.: 09/265,267

[22] Filed: Mar. 9, 1999

Related U.S. Application Data

[60] Division of application No. 09/022,433, Feb. 12, 1998, which is a continuation-in-part of application No. 09/005,851, Jan. 12, 1998.

[51] Int. Cl.[6] .................................................. F26B 3/08
[52] U.S. Cl. ........................................... 34/370; 34/372
[58] Field of Search ............................. 31/370, 371, 372, 31/375, 410, 589, 76, 77, 78, 86, 169, 170; 201/2, 2.5, 3, 31, 41; 202/168, 169, 170, 185.3; 62/606, 47.1, 50.5, 910

[56] References Cited

U.S. PATENT DOCUMENTS

| | | | |
|---|---|---|---|
| 3,747,513 | 7/1973 | Seelbach | 99/476 |
| 3,874,188 | 4/1975 | Zara et al. | 62/272 |
| 4,194,296 | 3/1980 | Pagnozzi et al. | 34/16.5 |
| 4,295,281 | 10/1981 | Potter | 34/10 |
| 4,371,425 | 2/1983 | Danguillier et al. | 202/228 |
| 4,471,537 | 9/1984 | Meda | 34/77 |
| 4,575,414 | 3/1986 | Skraba | 208/157 |
| 4,624,059 | 11/1986 | Hammarskog et al. | 34/20 |
| 4,678,028 | 7/1987 | Conant et al. | 165/72 |
| 4,776,104 | 10/1988 | Kuoyama | 34/77 |
| 4,839,969 | 6/1989 | Hahn | 34/169 |
| 4,897,933 | 2/1990 | Ito et al. | 34/58 |
| 5,146,693 | 9/1992 | Dottor et al. | 34/77 |
| 5,170,697 | 12/1992 | Kuboyama | 99/470 |
| 5,572,923 | 11/1996 | Kuboyama | 99/287 |

FOREIGN PATENT DOCUMENTS

| | | |
|---|---|---|
| 0 380 992 | 8/1990 | European Pat. Off. . |
| 1.127.267 | 12/1956 | France . |
| 63-207994 | 8/1988 | Japan . |
| 8-66615 | 3/1996 | Japan . |
| 21585 | 9/1912 | United Kingdom . |
| 1 435 490 | 5/1976 | United Kingdom . |
| 2 117 889 | 10/1983 | United Kingdom . |
| 80/01881 | 9/1980 | WIPO . |

*Primary Examiner*—Stephen Gravini
*Attorney, Agent, or Firm*—Nields, Lemack & Dingman

[57] ABSTRACT

Apparatus and method for condensing moisture from an air stream. The condensing comprises an outer container, a middle container within the outer container, and an inner container within the middle container. The outer container contains a cooling material, such as water, and upon contact therewith, the air stream is cooled and moisture contained therein is condensed. The inner container also can contain a cooling material.

1 Claim, 8 Drawing Sheets

EXTRACTION AND DRYING METHOD

This application is a Divisional of U.S. Ser. No. 09/022,433 filed on Feb. 12, 1998, which is a Continuation-In-Part of U.S. Ser. No. 09/005,851 filed on Jan. 12, 1998.

BACKGROUND OF THE INVENTION

The present invention relates to extraction and drying apparatus.

Apparatus disclosed in U.S. Pat. Nos. 5,572,923, 5,170,697 and 4,776,104, the disclosures of which are herein incorporated by reference, include extraction systems for extracting an effective ingredient from a material such as malt, soybean or the like. Such apparatus comprises a pulverizing minute particle generating tank including means for heating a reservoir of water to a predetermined temperature and a means for pulverizing or atomizing water; an extracting device connected to the pulverizing minute particle generating tank, which extracting device holds a raw material layer for adhering an effective ingredient of raw material to the pulverized minute particles as the pulverizing minute particles pass through the raw material layer; a condensing device connected to the extracting device for liquefying the pulverized minute particles that have passed through and extracted an effective ingredient from the raw material layer; a reserve tank into which the water liquefied at the condensing device empties; a blower provided in a path between the reserve tank and the pulverizing minute particle generating tank for decompressing the raw material layer within the extracting device; and a cooling means for cooling the condensing device and the reserve tank.

It would be desirable to improve the extracting and drying efficiency of such apparatus, especially in view of environmental factors including the desire to reduce global warming. In addition, it would be desirable to provide a drying apparatus that is applicable to other drying systems to improve the efficiency thereof, including conventional clothes dryers and the like.

SUMMARY OF THE INVENTION

The problems of the prior art have been overcome by the present invention, which provides a heating, extracting and condensing system and method for efficiently recovering an ingredient from a raw material. The condenser is made up of three preferably cylindrical containers, with at least one container having a cooling medium therein for condensing moisture from an air stream.

DETAILED DESCRIPTION OF THE PREFERRED EMBODIMENTS

Figure 1:
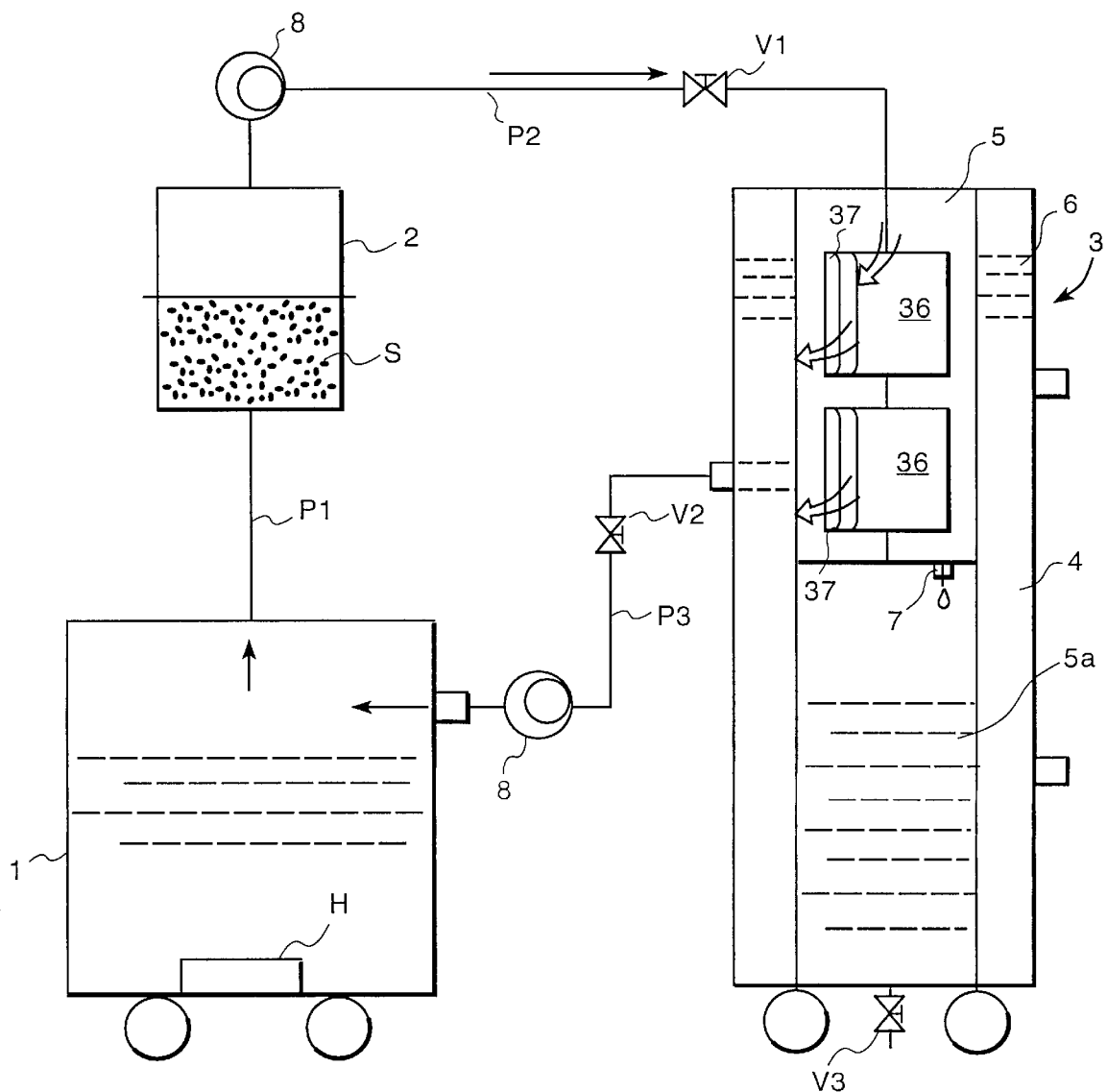
FIG. 1 is a schematic view of one embodiment of the extraction/drying apparatus of the present invention.

Hereinafter, a preferred embodiment of the present invention will be described in more detail with reference to the accompanying drawings. FIG. 1 is a schematic view showing a construction of a first embodiment of the manufacturing apparatus, and in the drawing, reference numeral 1 is a housing or container having a reservoir of liquid, preferably water, therein. The housing 1 is preferably made of stainless steel. The size of the housing 1 is not particularly limited, and in the extraction embodiment shown, generally depends upon the amount of raw material 4 used and the desired rate of extraction of effective ingredient therefrom. The housing 1 includes means H for heating the reservoir, which means is not particularly limited, and can include an electric heating element or coil, a UV or IR heating element, a burner, etc. The heating means H must be sufficient to heat the liquid in the housing 1 to a temperature necessary to cause vaporization of the liquid. The heater can be coupled to a gauge (not shown) to allow the operator to specify the desired liquid temperature, and to a switch (not shown) to activate the heater. The heating means H can be located inside or outside of the housing 1. Means (not shown) can be optionally provided in association with the housing 1 to generate pulverized minute particles of water or a mist. Suitable means include an ultrasonic wave generating device comprising one or more sets (depending upon the tank size) of vibrators provided at the bottom of housing 1, each vibrator having the ability to pulverize water and create a mist. Conventional ultrasonic wave generators that are used in domestic ultrasonic humidifiers are suitable. Centrifugal atomization could also be used.

Figure 3:
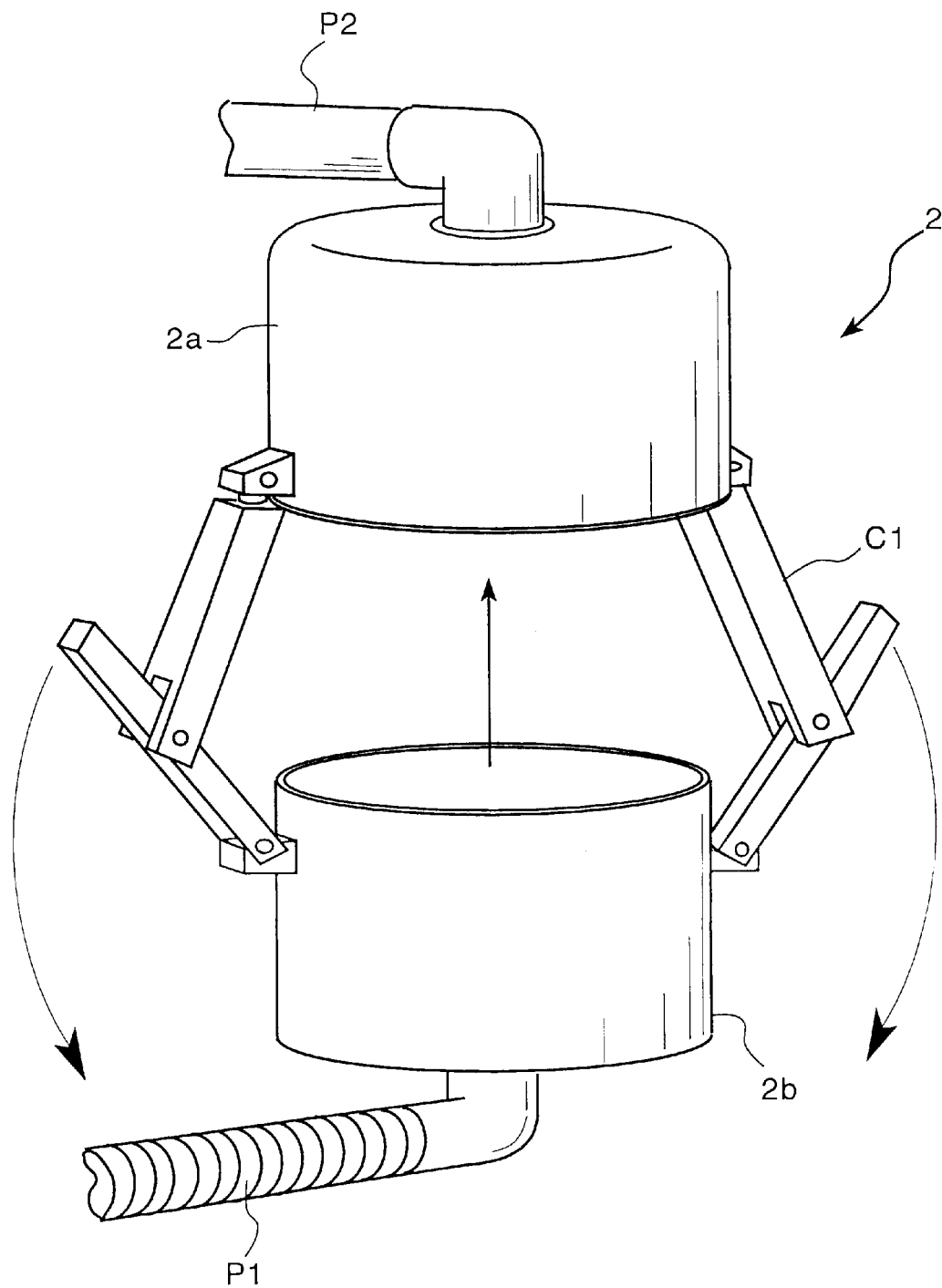
FIG. 3 is a fragmentary perspective view of an external cylinder of an extracting device for use with one embodiment of the present invention.

Housing 1 is in fluid communication via pipe P or the like with an extracting device 2 for extracting an effective ingredient from raw material S contained therein. FIG. 3 is a perspective view of the external appearance of the external cylinder which is the main element of the extracting device 2, and it includes a first external cylinder 2a and a second external cylinder 2b, both of which are constructed so as to be releasably joined to one another, and are preferably made of stainless steel. A temperature sensor (not shown) for detecting the temperature during the extraction operation can be fixed to the bottom side of the second external cylinder 2b. A hinged locking mechanism C1 joins cylinder 2a to cylinder 2b so that the raw material can be easily loaded and unloaded therefrom. FIG. 4 shows the extracting device 2 in its open, unlocked position.

Figure 4A:
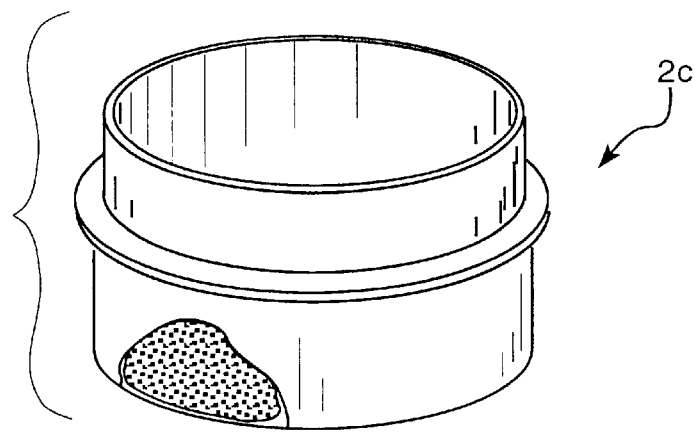
FIGS. 4(a), (b) and (c) are oersoective views showing the construction of the internal cylinder of an extracting device for use with one embodiment of the present invention.
Figure 4B:
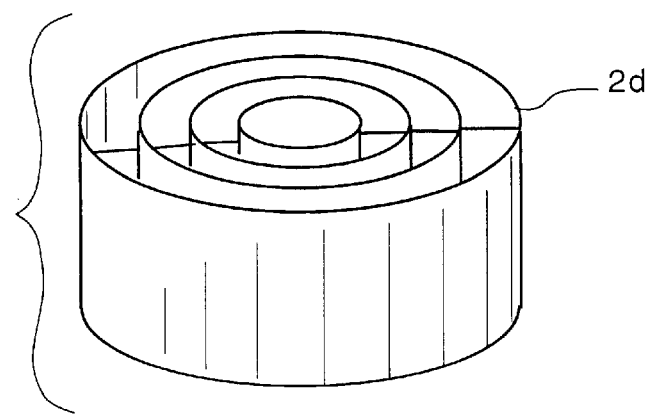
Figure 4C:
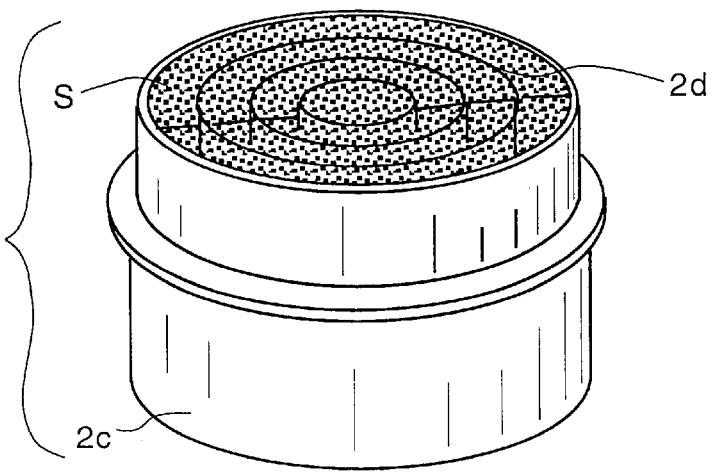

FIG. 4 is a schematic diagram of the internal cylinder which is housed in the external cylinder 2 of FIG. 3. FIG. 4(a) shows internal cylinder 2c, which is of a suitable shape and size to fit into the aforementioned external cylinder 2, and includes at the bottom thereof a net portion for holding the raw material that has been crushed into small pieces. FIG. 4(b) shows a guide plate 2d for insertion into the internal cylinder 2c, and as shown in FIG. 4(c), it is constructed so as to partition the crushed pieces S of raw material such as soy beans, malts or Korean ginseng in the interior of the internal cylinder 2c. The presence of this guide plate 2d allows the vaporized liquid from the housing 1 to easily and smoothing pass through the crushed pieces S of raw material as will be described below. Those skilled in the art will appreciate that other shapes for guide plate 2d may be used, such as a spiral shape.

The extracting device 2 is in fluid communication with condensing device 3 via pipe P2. A valve V1 can be positioned in pipe P2, and together with valve V2 in pipe P3 (discussed below), regulates the air flow to and the degree of decompression in condensing device 3. Preferably the condensing device 3 is comprised of two concentric cylinders; the outer cylinder 4 housing a cooling material to cool the contents of the inner cylinder 5. In the embodiment shown, the inner and outer cylinders are not co-extensive, thereby allowing for a lower inner portion 5a for collection of liquid condensate resulting from the cooling process. However, those skilled in the art will appreciate that the inner and outer cylinder 5 can be co-extensive, with suitable means (such as tubing in communication with the inner cylinder 5 at one end and with a supplementary container at the other) provided for condensate collection elsewhere. Similarly, the inner cylinder 5 could be smaller in length than the outer cylinder 4 in order to allow the cooling material contained in the outer cylinder 4 to surround not only the sides of the inner cylinder 5, but also the bottom thereof. In this latter embodiment, suitable means would again be provided for collecting the condensate elsewhere.

Preferably the cooling material 6 contained in the outer cylinder 4 is a liquid, such as water. However, the cooling material 6 can also be a gas or a solid such as ice or other material that can maintain a cold temperature for an extended period of time. The cooling material 6 can be circulated in the outer cylinder 4 to enhance cooling, and can be continuously or continually replenished during operation.

Figure 5:
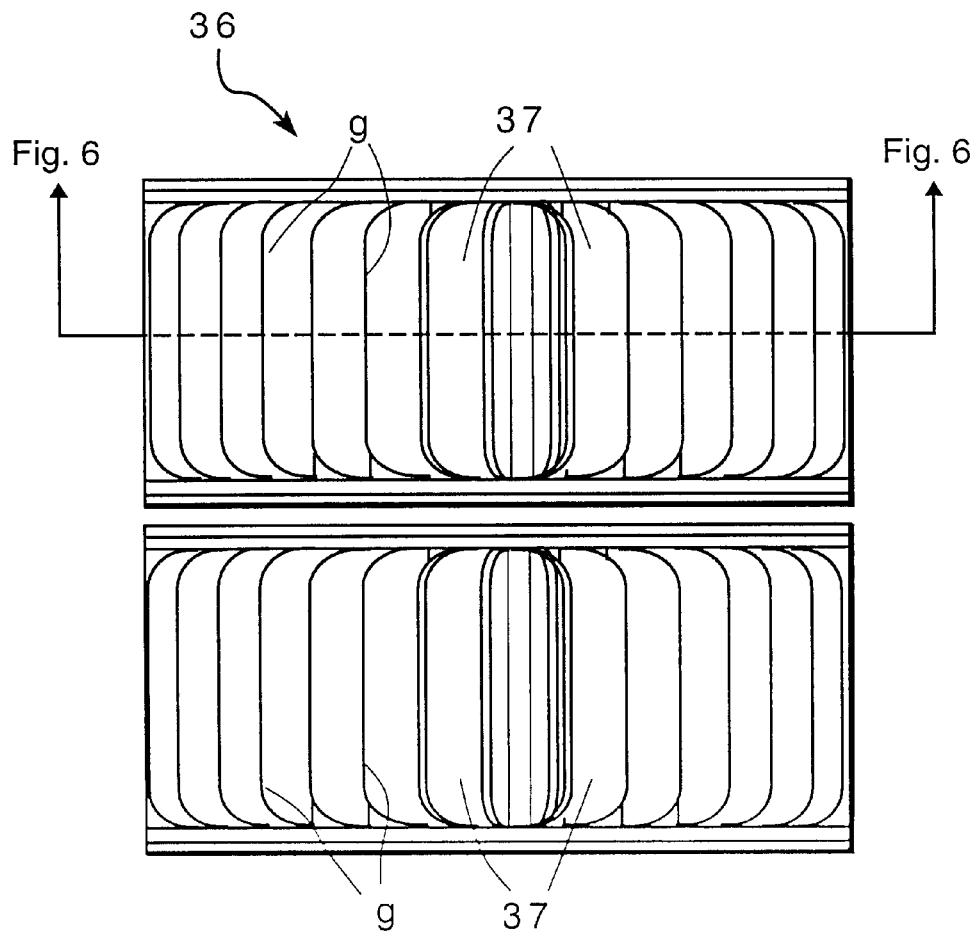
FIG. 5 is a plan view of air flow regulating means in accordance with the present invention.
Figure 6:
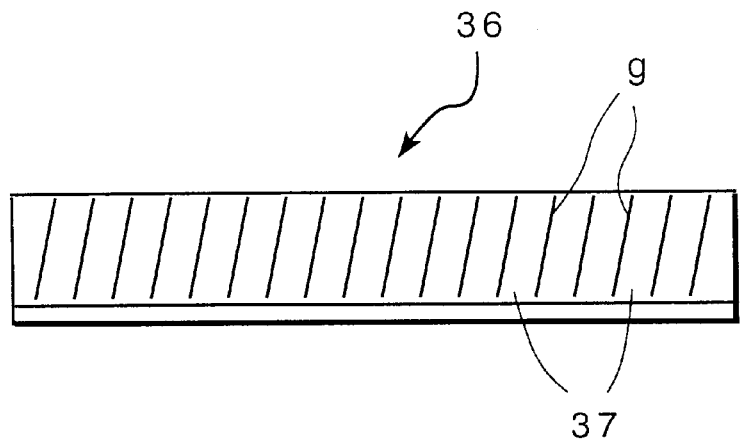
FIG. 6 is a section view taken along lines XI—XI of FIG. 5.

Preferably the inner cylinder 5 contains one or more air flow regulator means 36, most preferably two as shown. As illustrated in FIGS. 5 and 6, the air flow regulators 36 comprise a plurality of sloping plates 37 with a gap "g" formed between adjacent sloping plates 37. By adjusting the inclination of the sloping plates 37, it is possible to adjust the quantity of the air flow being regulated. Air flowing into the inner cylinder 5 causes the air flow regulators 36 to rotate about a vertical axis, thereby forcibly directing the air flow toward the wall of the cylinder 5 which is cooled by the cooling material 6 in the outer cylinder 4. Alternatively, the air flow regulator(s) 36 can be driven by a motor or the like to increase the extraction of the moisture from the air stream. Resulting condensate is drained from drain 7 and is collected.

Figure 8:
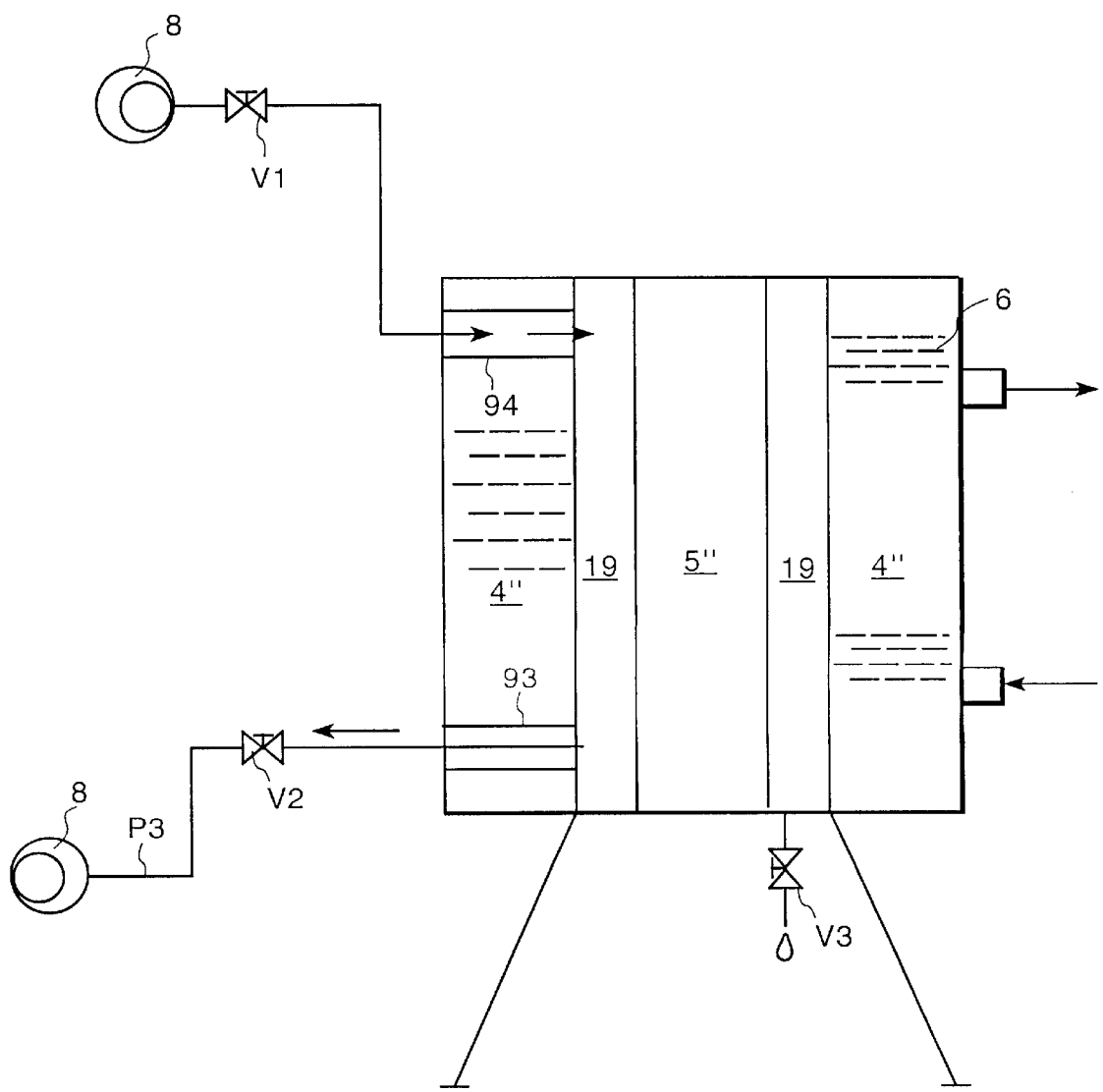
FIG. 8 is a schematic view of a condensing device in accordance with a fourth embodiment of the present invention.

FIG. 8 illustrates an alternative embodiment of the condensing device 3 where air flow regulation is accomplished using a triple container design or the like. The outer container 4" contains a cooling material 6 in its annulus, as in the previous embodiments. The middle container M receives the air flow from the extracting device via suitable piping 94, and the air flow proceeds out of the device (and optionally is recycled back to housing 1) via pipe 93. A central container 5" is positioned so as to assist in directing the contents of the middle container M against the outer container 4" to enhance cooling. The shape of the containers are preferably cylindrical but need not be; other shapes are suitable as long as cooling is enhanced such as by forcing the air in the middle container M against the outer container 4". Surface area of the cooling walls is also important; thus a zig-zag shape could be used to increase surface area; or alternating projections could extend from the cooling walls to increase the surface area thereof.

Figure 9:
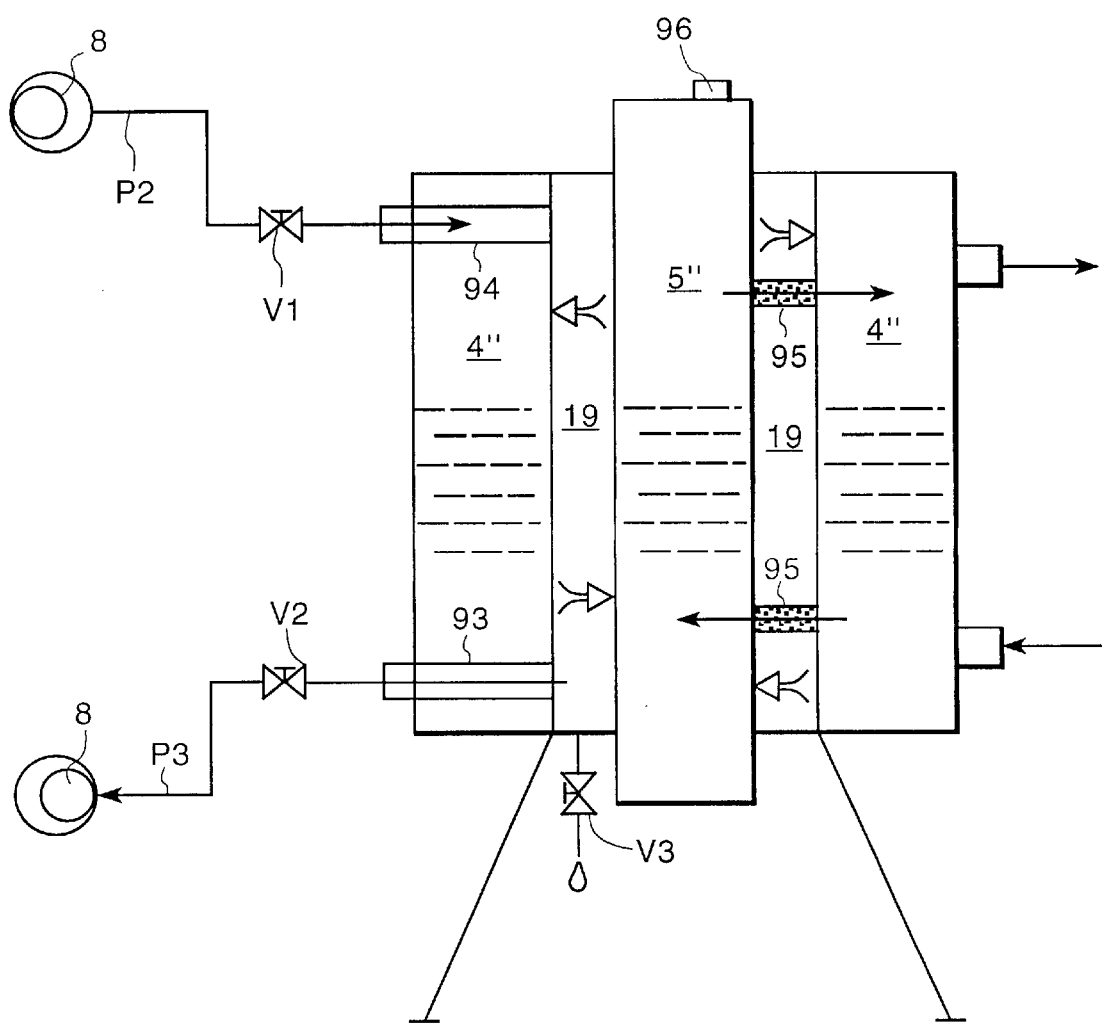
FIG. 9 is a schematic view of a condensing device in accordance with a fifth embodiment of the present invention.

FIG. 9 illustrates a still further alternative embodiment of the condensing device. This embodiment is similar to that shown in FIG. 8, except the central container 5" is filled with a cooling fluid, which can be the same or different from the cooling fluid contained in the outer container 4X. Where the fluid is the same, connecting means 95 can be provided between the central container 5" and the outer container 4" to circulate the cooling fluid therebetween. As in the embodiment of FIG. 8, the central container 5" is preferably but need not by cylindrical; other shapes that enhance cooling by increasing the surface area of the cooling surfaces and assist in forcing the medium to be cooled against the cooling surfaces can be used. The central container 5" can also be made shorter so that the medium to be cooled is also exposed to the bottom of the container. In addition, the inlet and outlet for the medium to be cooled can be located so that the medium to be cooled travels around the perimeter of the central container 51" prior to its exit from the condensing device. As in from FIG. 9, the central container 51, also can be longer than the outer container 4" and middle container M, and includes an inlet 96 for introducing the cooling fluid therein. The condensing devices shown in FIGS. 8 and 9 can be used with the extraction system shown in FIGS. 1 and 2, or can be used alone to remove moisture (and dust) from air, such as in a warehouse or other housing where moisture-sensitive material (e.g., paper, cement, dry food, grain, etc.) is stored, in a greenhouse, in a clean-room, or other high-humidity area. A further application is at a deep boring site for tunnel construction or under the sea construction. The device can be combined with a heater to increase the temperature of the medium from which moisture is being removed. A plurality of the device can be arranged in series to enhance condensing, and can be arranged in series either vertically or horizontally, depending in part on space considerations. The device is easier and faster to manufacture than the embodiment of FIG. 2 using the rotary device to regulate air flow.

At least one or more (two shown) air circulating or driving means is provided, preferably in the form of a fan or blower 8. The fan(s) 8 should be of a sufficient size so as to create decompression and provide flow through the system. The decompression should be within the range of about 5 to 500 mm $H_2O$. A conventional domestic vacuum cleaner fan has been found to be effective.

The condensing device 3 is in communication with housing 1 via pipe P3. Valve V2 can be positioned in pipe P3 to regulate air flow and decompression with valve V1. For example, if valve V1 is partially closed while valve V2 is open, then the condensation apparatus 3 will be under a state of decompression. If valve V2 is partially closed while valve V1 is open, the pressure in the condensation apparatus 3 will increase. The modulating of the valves can be accomplished manually or automatically.

The operation of the apparatus will now be described based upon the above construction, and also a preferred embodiment of the beverage manufacturing method will be described.

First, raw material, which can include herbs, vegetables, seaweed, corn, meat, fish, shellfish, soy beans, etc. is crushed to a magnitude approximating rice grains by any suitable means and is filled into the internal cylinder 2c illustrated in FIG. 5(a) Once filled, the net is placed over the raw material in order to stably maintain it in the internal cylinder 2c.

Successively, the internal cylinder 2c is inserted into the external cylinder 2 shown in FIG. 3. The housing 1 is filled with a sufficient amount of water or other liquid so that a mist can be produced. The water can be maintained at the same level continuously, or can be added batchwise. The temperature gauge is set to the desired temperature, and the heater is activated to heat the water to a suitable temperature such that the temperature in the extracting device 2 is at such a level (generally below 100° C.) as to not destroy the effective ingredients of the raw material. For example, in the case of soybeans, the temperature of the water is preferably heated to about 85° C., so that the temperature of the water when it reaches the extracting device is between about 60–70° C., preferably about 65° C.

Once the water temperature in the housing 1 reaches the desirable level, the blower(s) 8 is activated to initiate flow through the system. The blower(s) 8 causes air flow to circulate in the closed circulating path formed by the housing 1, the extracting device 2 and the condensing device 3, as well as the pipes connecting these respective devices. The mist of water generated in the housing 1 thus pass through pipe P together with the air flow and reaches the extracting device 2. The temperature in the extracting device 2 can be measured by a temperature sensor to ensure that the appropriate temperature is reached therein. The temperature in the housing 1 can be controlled in response to the temperature in the extraction device 2.

As described above, the air flow is circulated between each device by the operation of the blower(s) 8, but since the extracting device 2 is filled with the crushed particles S of raw material, the raw material creates a resistance to the air flow, thereby creating a decompressed space within the extracting device 2.

Once the decompressed state is achieved, ingredients within the raw material are extracted to the surface of the crushed pieces S of raw material, and are then captured by the mist of water passing therethrough. Since the temperature within the extracting device, and more particularly, the temperature within the internal cylinder 2c is maintained within the desired range, the ingredients contained in the raw material are extracted into the water without being destroyed by heat.

The resulting water containing the effective ingredient of the raw material then flow to the condensing device 3 through the connecting pipe P2 together with the air flow from the blower 8. The outer cylinder 4 of the condensing device 3 is filled with cooling material, preferably water, at a temperature sufficient to cause condensation of the water in the inner cylinder 5. Air flow and decompression in condensing device 3 are controlled by modulating of valves V1 and V2. The liquefied or condensed material drains through drain 7 as shown, and can be ultimately collected through valve V3.

The particles which are not liquefied in the condensing device 3 are sucked towards the housing 1 through the connecting pipe P3 together with the air flow, and are thereby recycled. The recycled portion optionally can be preheated such as by a rectifying plate or spiral shape, so as not to lower the temperature of the water in the tank 1.

The cooling material in the condensing device 3 can be changed periodically. Alternatively, a continuous flow of cooling liquid can be used to cool the inner cylinder 5.

The raw material can be crushed to about the size of rice grain. However, the concentration of effective ingredient contained in the final product can be controlled by varying the size of the raw material. For example, if the raw material is crushed into fine pieces, a final product high in effective ingredient concentration can be obtained. However, in such a case the rate of final product produced decreases. As the size of the raw material increases, the concentration of effective ingredient in the final product decreases, and the rate of production increases. Similarly, the use of the guide plate 2d increases the yield of final product per hour by about 20%, but the concentration of effective ingredient in the final product decreases.

The final product is a colorless, transparent and clear liquid containing a known material and an unknown active material which has not been analyzed or further extracted.

The health beverage refined from the raw material has a noticeable efficacy, and numerous examples of an activation of human cell are reported as a result of drinking after meals final product diluted by adding 5 cc to 180 cc of water. The resulting beverage has a vague smell and a faint flavor of the raw material, such as soy bean flavor, when it is drunk by adding the same to mineral water and the like.

In the above described embodiment, although soybean is mentioned as a raw material, the present invention is not to be so limited, as it is possible to manufacture entirely new beverages, by using various materials known to contribute to human health from ancient times. The present invention can obtain a health beverage which is particularly effective and novel for maintaining human health by extracting an ingredient from various materials which could not be extracted heretofore by the construction and operation as described above.

Figure 2:
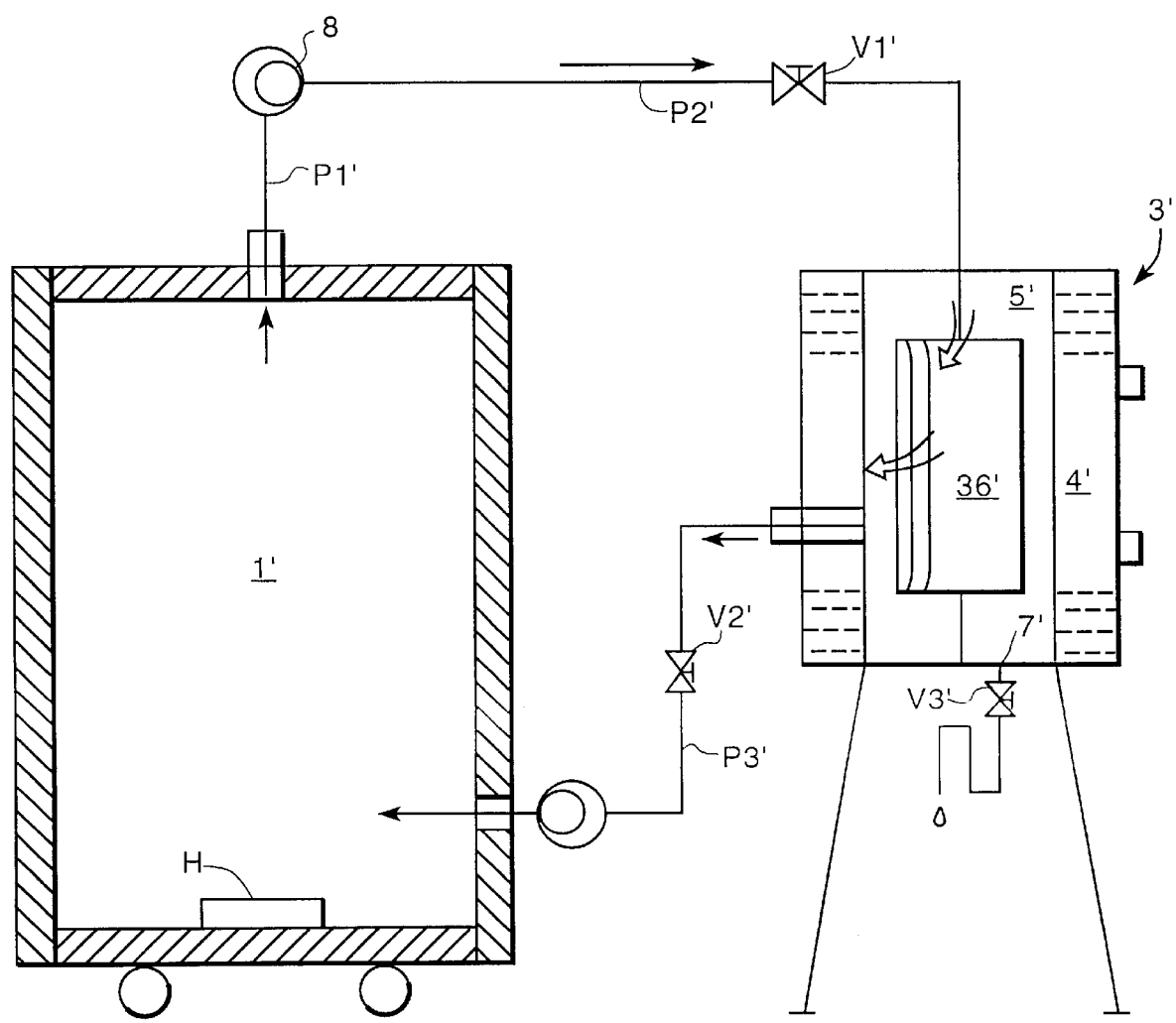
FIG. 2 is a schematic view of another embodiment of the extraction/drying apparatus of the present invention.

Turning now to FIG. 2, the condensing device 3' of the present invention is shown in communication with a conventional dryer represented by housing 1'. Examples of such conventional dryers are clothes dryers, granular dryers and wood dryers. Any conventional dryer can be used, provided that the dryer has drying air that becomes moisture-laden as a result of the drying. Preferably the dryer is airtight. Inclusion of the condensing device 3' with a conventional dryer reduces the drying time by 50% or more. In addition, the drying temperature can be reduced relative to a dryer without such a condensing device, in view of the decompression in the system, the absence of moisture-laden outside air infiltrating the system, and the fine control of the moisture content in the drying air.

The embodiment of FIG. 2 is similar to that of FIG. 1, except that no extraction device is present. Thus, air from the dryer 1 is directed by a blower 8 to a condensing device 3' in fluid communication therewith. The condensing device 3' is similar to that described above with respect to FIG. 1, although it is shown in FIG. 2 with only one air flow regulating device 36' (more could be used). Incoming moisture-laden air is directed thereby to the common annular wall of inner cylinder 5' and outer cylinder 4, where it is cooled upon contact therewith to a temperature below the dew point of the moisture contained in the air. The resulting condensate produced by the cooling flows through drain 7' and is collected or discarded. The cooled air, whose moisture content has been reduced, is then returned to the dryer via pipe P3'. A valve V2' can be provided in line P3' to regulate the amount of air being recycled, and to control air flow and decompression in condensing device 3' with valve V1'. The recycled air optionally can be reheated by separate heating means (not shown) prior to its entry into dryer housing 1'.

Figure 7:
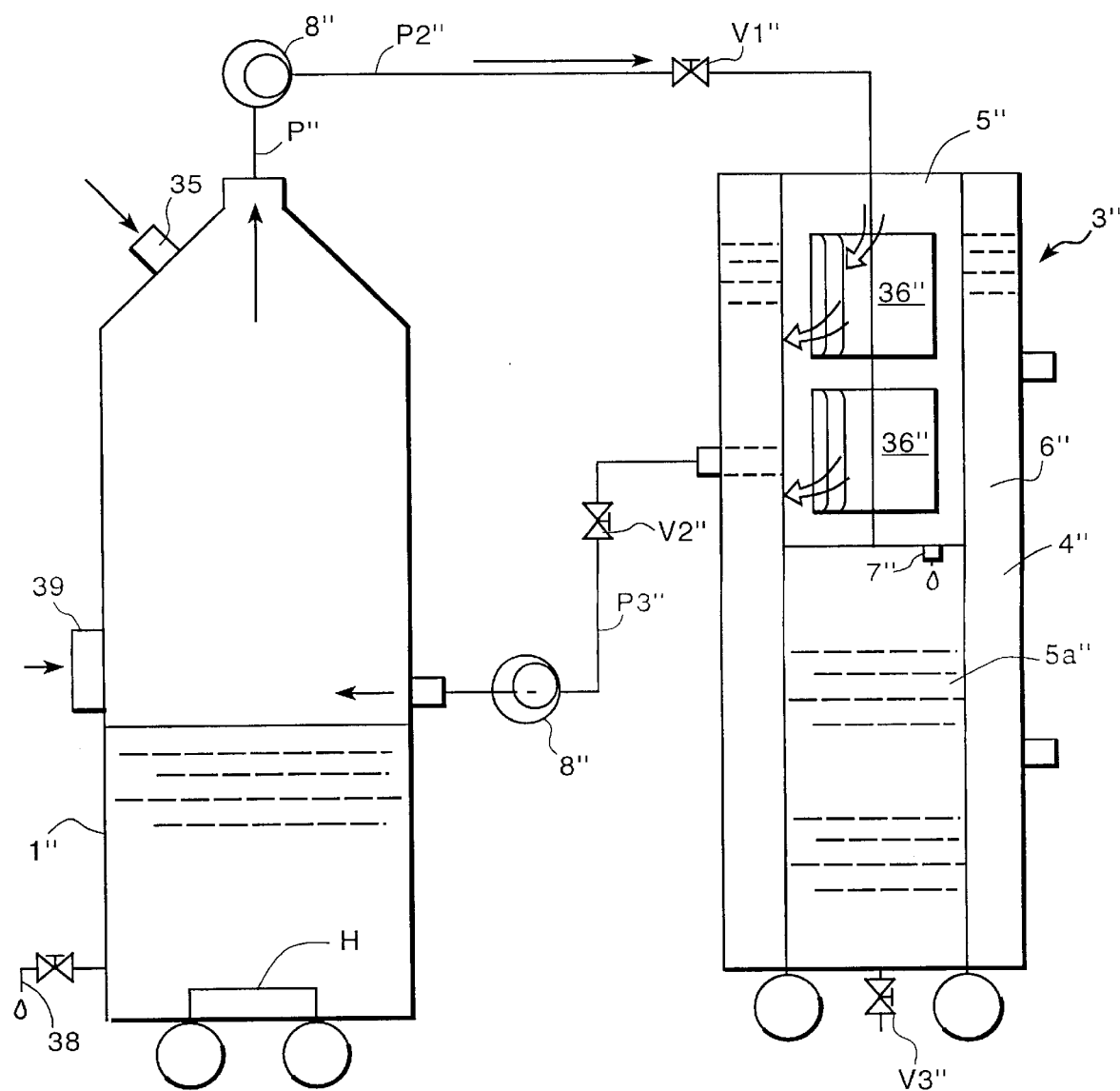
FIG. 7 is a schematic view of a third embodiment of the extraction/drying apparatus of the present invention.

Turning now to FIG. 7, a third embodiment of the apparatus of the present invention is shown. This embodiment is similar to the embodiment of FIG. 1, except that no separate extracting device 2 is used. This embodiment is applicable where the material from which extraction is taking place is a liquid, such as sea water, ground water, spring water, hot spring water, etc. Accordingly, housing 1" is in direct communication with condensing device 3" through pipe P" and P2". Suitable heating means H, which can be located either inside or outside the housing 1", is provided to heat the liquid. An inlet 35 is provided in housing 1" for introducing into the housing the liquid medium from which extraction will take place. An access port 37 can be provided in housing 1" for cleaning purposes. A drain 38 with suitable valving also can be provided.

With the foregoing apparatus described in each of the embodiments, it is possible to obtain balanced drying without influence from external air by circulating moisture-laden air through a condensing device to reduce or eliminate the moisture content thereof. The result is a substantial reduction in drying time and concomitant energy requirements therefor.

What is claimed is:

1. A method of enhancing the drying of a dryer by condensing moisture contained in the air circulating in said dryer, said method comprising:

directing said moisture-laden drying air from said dryer to a condenser comprising an outer container, a middle container within said outer container, and an inner container within said middle container, said inner container and said middle container having a common annular wall, said outer container comprising a cooling material;

causing said drying air to contact said common annular wall thereby cooling said drying air and causing moisture to condense therefrom; and circulating the resulting cooled drying air back to said dryer.

* * * * *

Disclaimer and Dedication

5,996,247—Nobuyoshi Kuboyama, Carlisle, Mass., EXTRACTION AND DRYING METHOD, Patent dated Dec. 7, 1999. Disclaimer and dedication filed Oct. 8, 2002, by the assignee, Big Beans Holding Ltd.
Hereby disclaims and dedicates to the public all claims of said patent.

*(Official Gazette, June 24, 2003)*